Figure 1:
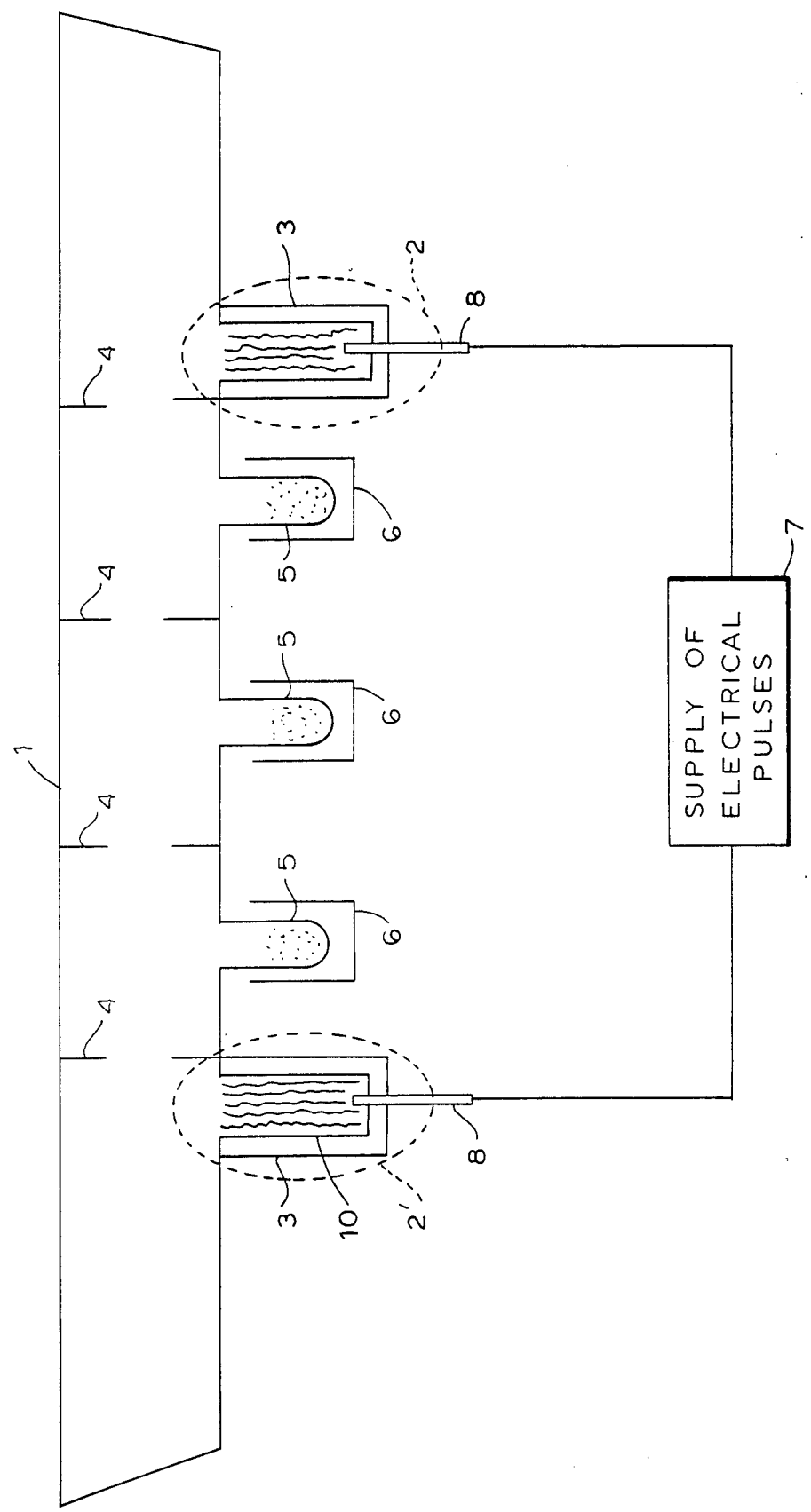

United States Patent [19]

Sabotinov et al.

[11] Patent Number: 4,635,271
[45] Date of Patent: Jan. 6, 1987

[54] GAS LASER DISCHARGE TUBE WITH COPPER HALIDE VAPORS

[75] Inventors: Nikola V. Sabotinov; Nikolay K. Vutshkov; Dimo N. Astadjov, all of Sofia, Bulgaria

[73] Assignee: Institute po Physika na Tvardoto Tyalo, Sofia, Bulgaria

[21] Appl. No.: 724,607

[22] Filed: Apr. 18, 1985

[30] Foreign Application Priority Data

Apr. 18, 1984 [BG] Bulgaria .................................. 65131

[51] Int. Cl.$^4$ ............................................... H01S 3/03
[52] U.S. Cl. ........................................ 372/61; 372/56; 372/34; 372/87; 372/103
[58] Field of Search ....................... 372/56, 61, 88, 87, 372/34

[56] References Cited

PUBLICATIONS

Smilanski et al; "A Hollow-Cathode Copper Halide Laser", IEEE JQE, vol. QE-13, No. 1, Jan. 1977.

Primary Examiner—Leon Scott, Jr.

[57] ABSTRACT

Gas laser discharge tube with copper halide vapors. The tube has a vacuum tight quartz casing equipped with at least two electrodes which are disposed in extensions of the quartz casing. The electrodes are made of copper particles of irregular form which make contact with the vacuum tight terminals. The copper particles are piled in quartz tubes disposed coaxially in the quartz extensions, so that between the quartz tube and the extensions of each electrode there is formed a cavity. Each quartz tube is perforated along its entire surface and it is plugged by a perforated copper plate through which the vacuum tight terminal passes. The apertures in the quartz tube and in the copper plate have a smaller diameter than the diameter of the copper particles. This gas discharge tube may be used in scientific research, laser locating, and the like.

1 Claim, 2 Drawing Figures

GAS LASER DISCHARGE TUBE WITH COPPER HALIDE VAPORS

The invention relates to a gas laser discharge tube with copper halide vapors used in scientific research, laser microscopy, medicine, biology, submarine research, laser locating, and the like.

A gas laser discharge tube with copper halide vapors is known comprising a vacuum tight quartz casing in which there are disposed at least two electrodes made up by copper particles filling up cup-like quartz extensions of the casing. The particles of copper have an irregular form, and make contact with vacuum tight terminals.

A disadvantage of this known gas discharge tube is that, in case of long lasting operation of the laser, in the colder ends of the electrodes there is accumulated copper halide. This causes the destruction of the electrodes, and an uncontrollable entering of copper halide into the volume of the gas discharge tube, such halide having condensed on the electrodes. As a result, the discharge conditions of the laser are disturbed, and its further operation is interrupted, i.e. its life duration is shortened.

The object of the invention is to provide a gas discharge tube for laser with copper halide vapors having a prolonged life duration.

This object is achieved by a gas laser discharge tube with copper halide vapors comprising a vacuum tight quartz casing with at least two electrodes made up by copper particles of irregular form which fill up quartz extensions of the casing and make contact with vacuum tight terminals. The copper particles are piled in quartz tubes disposed coaxially in the quartz extensions, so that a cavity is formed between them. Each quartz tube is perforated and is plugged by a perforated copper plate through which a vacuum tight terminal passes. The apertures in the quartz tubes and in the copper plates have a smaller diameter than the size of the copper particles.

The advantage of the gas laser discharge tube with copper halide vapors of the invention is its prolonged life duration.

Figure 2:
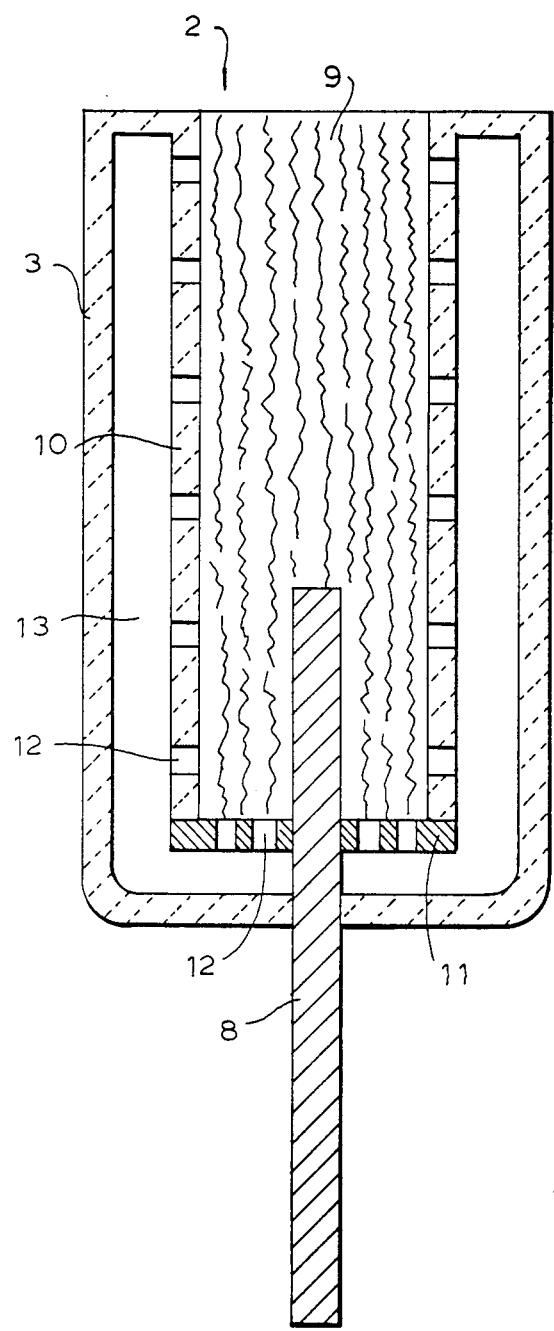

The invention is illustrated by an exemplary embodiment as shown on the accompanying drawings in which:

FIG. 1 is a longitudinal section of a gas laser discharge tube with copper halide in accordance with the invention; and FIG. 2 is a longitudinal section on an enlarged scale of an electrode of the gas discharge tube of FIG. 1.

The gas discharge tube (FIG. 1) comprises a vacuum tight quartz casing 1 in which there are placed two electrodes 2, 2' disposed in cup-like quartz extensions 3 of casing 1; in casing 1 there are uniformly disposed at a certain distance quartz diaphragms 4 restricting the discharge in the central zone of the tube. Casing 1 is equipped at its bottom with reservoirs 5 for copper halide, for example, copper bromide which are embraced by electrical resistance heaters or furnaces 6. Both electrodes 2, 2' are connected to an electrical pulse supply source 7 by vacuum tight terminals 8. Each of the electrodes 2, 2' comprises copper particles 9 of irregular form, piled in a quartz tube 10 that is disposed coaxially of the quartz extension 3. The distance between the wall of quartz tube 10 and the wall of quartz extension 3 is greater than 3 mm. The copper particles 9 make contact with the vacuum tight terminals 8 of electrodes 2, 2'.

The quartz tube 10 (FIG. 2) is perforated along all its surface by apertures 12. Its end towards the vacuum tight terminal 8 is plugged by a copper plate 11 which is also perforated by apertures 12. The perforated apertures 12 have a size smaller than that of the copper particles, thus ensuring the holding back of the copper particles 9 in the quartz tube 10. The distance between the perforated copper plate 11 and the bottom of the quartz extension 3 in which there is disposed the vacuum tight terminal 8 contacting with the copper particles 9 is greater than 3 mm. Between the quartz tube 10 and the quartz extension 3 there is formed a cavity 13.

The gas laser discharge tube with copper bromide vapors in accordance with the invention operates as follows: From the electrical supply source 7 for the electrodes 2, 2' there are transmitted high-voltage pulses. In the thus formed electrical discharge the copper bromide is dissociated. There also results atomic transitions of the copper. During the recombination of the bromine, the remaining non-combined free bromine is retained by the copper particles 9 in electrodes 2. The copper bromide formed and penetrating the copper particles 9 through the apertures 12 of quartz tubes 10 and the perforated copper plates 11 passes into the cavity 13 where it condenses due to the fact that cavity 13 is the coldest part of electrodes 2, 2'. As a result, even after a long lasting operation of the laser the copper particles 9 remain free of copper bromide; thus, there is avoided the destruction of the electrodes, as well as the uncontrollable entering of copper bromide into the active zone of the gas discharge tube.

Experimental apparatus in accordance with the invention has operated successfully for up to 700 hours. It is expected that such apparatus will continue to operate successfully for a total of about 1000 hours.

Although the invention is described and illustrated with reference to a single embodiment thereof, it is to be expressly understood that it is in no way limited to the disclosure of such preferred embodiments but is capable of numerous modifications within the scope of the appended claims.

We claim:

1. In a gas laser discharge tube with copper halide vapors, comprising a vacuum tight quartz casing equipped with at least two electrodes which are disposed in quartz extensions of the quartz casing, said electrodes being made up of copper particles with irregular form and making contact with vacuum tight terminals, the improvement wherein the copper particles are piled in quartz tubes disposed coaxially within the quartz extensions so that between each quartz tube and the respective quartz extension of each electrode there is formed a cavity, each quartz tube being perforated along its entire surface and being plugged by a perforated transverse copper plate through which each respective vacuum tight terminal passes, the apertures of the perforated quartz tube and of the perforated copper plate having a smaller diameter than the size of the copper particles.

* * * * *